United States Patent [19]

Ando et al.

[11] Patent Number: 5,680,137
[45] Date of Patent: Oct. 21, 1997

[54] RADAR SYSTEM

[75] Inventors: Hiroyuki Ando; Shigeki Kato, both of Wako, Japan

[73] Assignee: Honda Giken Kogyo Kabushiki Kaisha, Tokyo, Japan

[21] Appl. No.: 573,941

[22] Filed: Dec. 18, 1995

[30] Foreign Application Priority Data

Dec. 19, 1994 [JP] Japan ................................ 6-315263

[51] Int. Cl.⁶ ...................................... G01S 13/34
[52] U.S. Cl. ............................................ 342/127
[58] Field of Search ................................ 342/118, 127, 342/128, 131, 132, 134

[56] References Cited

U.S. PATENT DOCUMENTS 5,087,918  2/1992  May et al. ............................ 342/70

FOREIGN PATENT DOCUMENTS

| 57-166573(A) | 4/1981 | Japan . |
| 57-142575(A) | 9/1982 | Japan . |
| 3-103789(A)  | 4/1991 | Japan . |
| 6-249944(A)  | 9/1994 | Japan . |

*Primary Examiner*—Daniel T. Pihulic
*Attorney, Agent, or Firm*—Lyon & Lyon LLP

[57] ABSTRACT

A radar system allows switched use of an FM-CW radar mode and a phase difference radar mode, the FM-CW radar mode being designed for use in sensing a target at a medium and long distance away and the phase difference radar mode being designed for use in sensing a target at a short distance away, whereby a target at an extremely short to long distance away can be sensed with high accuracy.

8 Claims, 4 Drawing Sheets

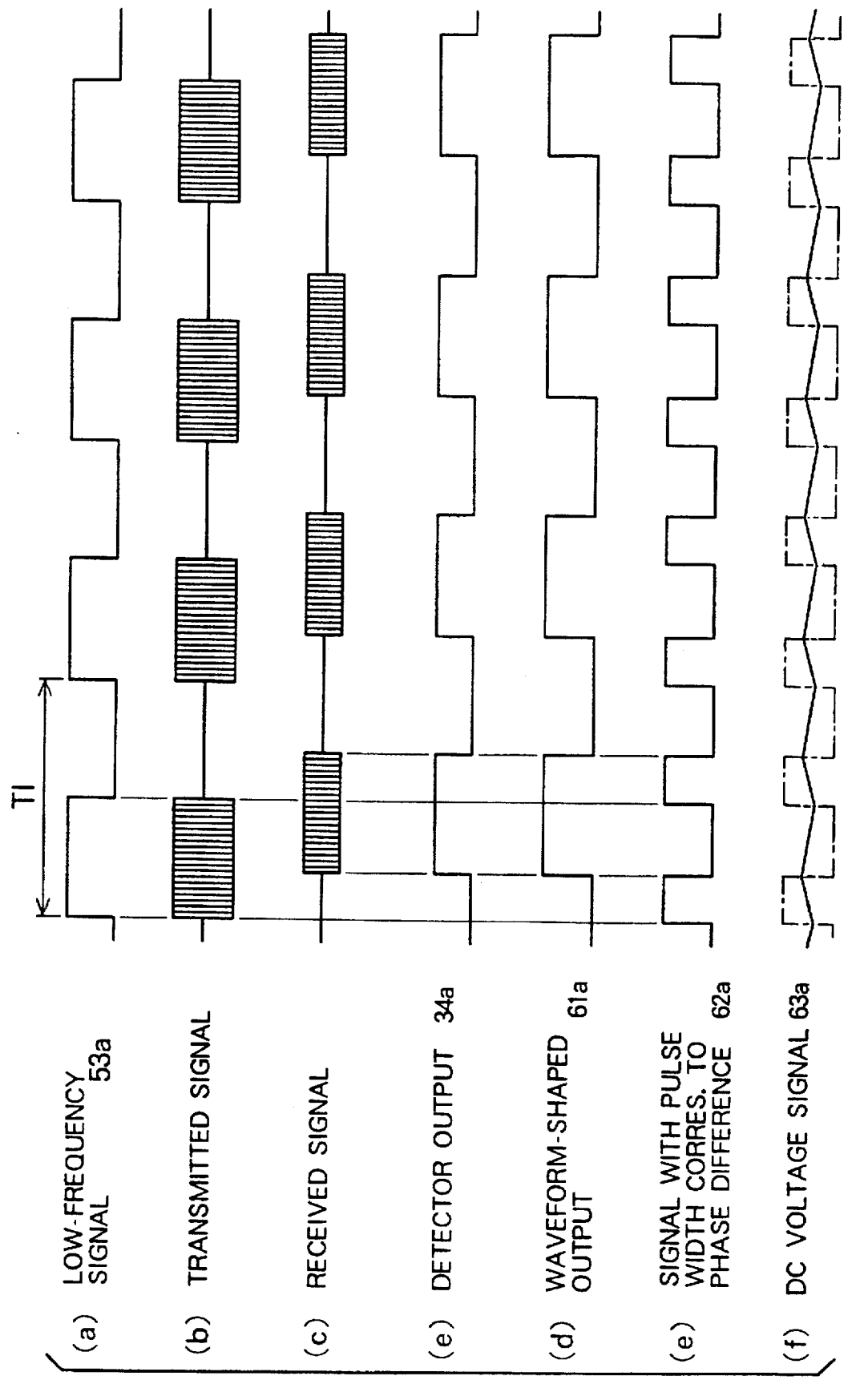

RADAR SYSTEM

BACKGROUND OF THE INVENTION

1. Field of the Invention

The present invention relates to a radar system which is designed to sense a target at a short to long distance away by switched use of a frequency modulated-continuous wave (FM-CW) radar module and a phase difference radar module.

2. Description of the Related Art

Japanese Patent Laid-Open Publication No. HEI 3-103789 proposes a millimetric wave radar system wherein a pulse compression receiver is added to an FM-CW radar of the system and the S/N ratio of received signals is improved by pulse compression, via a distributed delay line filter, of the reflected signals of transmitted FM-CW waves to thereby increase a sensing range.

Proposed in Japanese Patent Laid-Open Publication No. HEI 6-249944 is a radar system comprising an array antenna divided into a plurality of blocks and a control for effecting by-the-block ON/OFF control of transmission and reception paths for allowing switched use of a pulse radar mode in which all of the blocks of the array antenna are used for both transmission and reception, and a CW radar mode in which the blocks are grouped for transmission and reception, whereby the system is rendered capable of performing both a pulse radar function and a CW radar function with a single antenna.

Also proposed in Japanese Patent Laid-Open Publication Nos. SHO 57-142575 and SHO 57-166573 is a micro range finder wherein signals resulted from amplitude modulation (AM) of microwaves by means of low frequency signals are transmitted and the received signals reflected by a target are amplified and subjected to AM detection, whereafter the phase difference between the received low frequency signals and transmitted low frequency signals is determined for obtaining the distance to a target.

In the millimetric wave radar system having a pulse compression receiver, a short-range sensing is conducted using the FM-CW receiver, and a long-range sensing is conducted using the pulse compression receiver. The FM-CW receiver is designed to sense a distance to a target based on the frequency of a beat signal obtained by synthesizing a transmitted signal and a received signal but has a problem such that its sensing accuracy decreases when sensing a target at an extremely short distance away due to the beat signal frequency dropping under the influence of 1/f characteristic noise. It is also difficult for a radar system allowing switched use of a pulse radar and CW radar to sense with high accuracy a target extremely short distance away. Further, difficulty is experienced when carrying out a long range sensing with an amplitude modulation (AM) type system, because the sensing range is restricted by the wavelength of the low frequency signal used for modulation.

SUMMARY OF THE INVENTION

It is therefore an object of the present invention to provide a radar system which is capable of sensing a target at a short to long distance away with high accuracy.

According to the present invention, there is provided a radar system adapted to transmit a signal of high frequency, receive a signal reflected by a target and determine a distance to the target based on the time difference between the transmitted signal and received signal, the system comprising: an FM-CW radar mode designed to transmit an FM-CW signal resulted from sweeping the frequency of a first high frequency signal, receive a signal reflected by said target and determine the distance to said target based on the frequency of a beat signal obtained by mixing said transmitted signal and received signal; a phase difference radar mode designed to transmit a signal resulted from modulation of a second high frequency signal by a low frequency signal, receive and detect a signal reflected by said target and determine the distance to said target based on the phase difference between said received, detected low frequency signal and said transmitted low frequency signal; and a switch for allowing switched use of said FM-CW radar mode and said phase difference radar mode.

With the inventive radar system thus arranged, it is possible to sense a target at a short to long distance away with high accuracy since switched use of the FM-CW radar mode and phase difference radar mode is allowed. The FM-CW radar mode may be used for sensing a target at a medium or long distance away while the phase difference mode may be used for sensing a target at a short distance away.

BRIEF DESCRIPTION OF THE DRAWING

The above and other objects, features and advantages of the present invention will become apparent from the following detailed description when read in conjunction with the accompanying drawings, in which:

FIG. 4 is a time chart showing operation of the phase difference sensor.

DETAILED DESCRIPTION OF THE INVENTION

Preferred embodiment of the present invention will now be described in detail, by way of example, with reference to the accompanying drawings.

Figure 1:
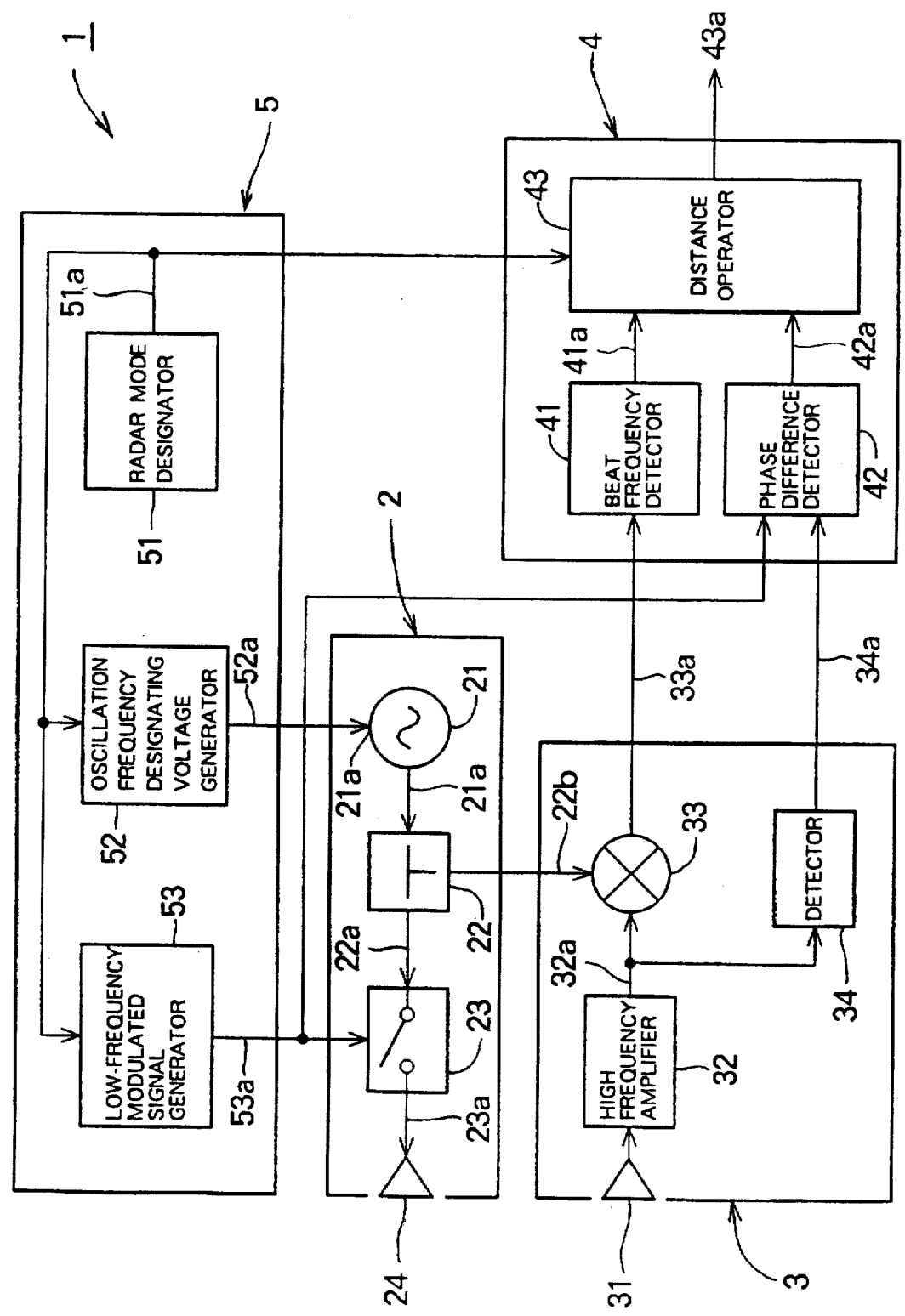
FIG. 1 is a block diagram illustrating a radar system according to the invention.
Figure 2:
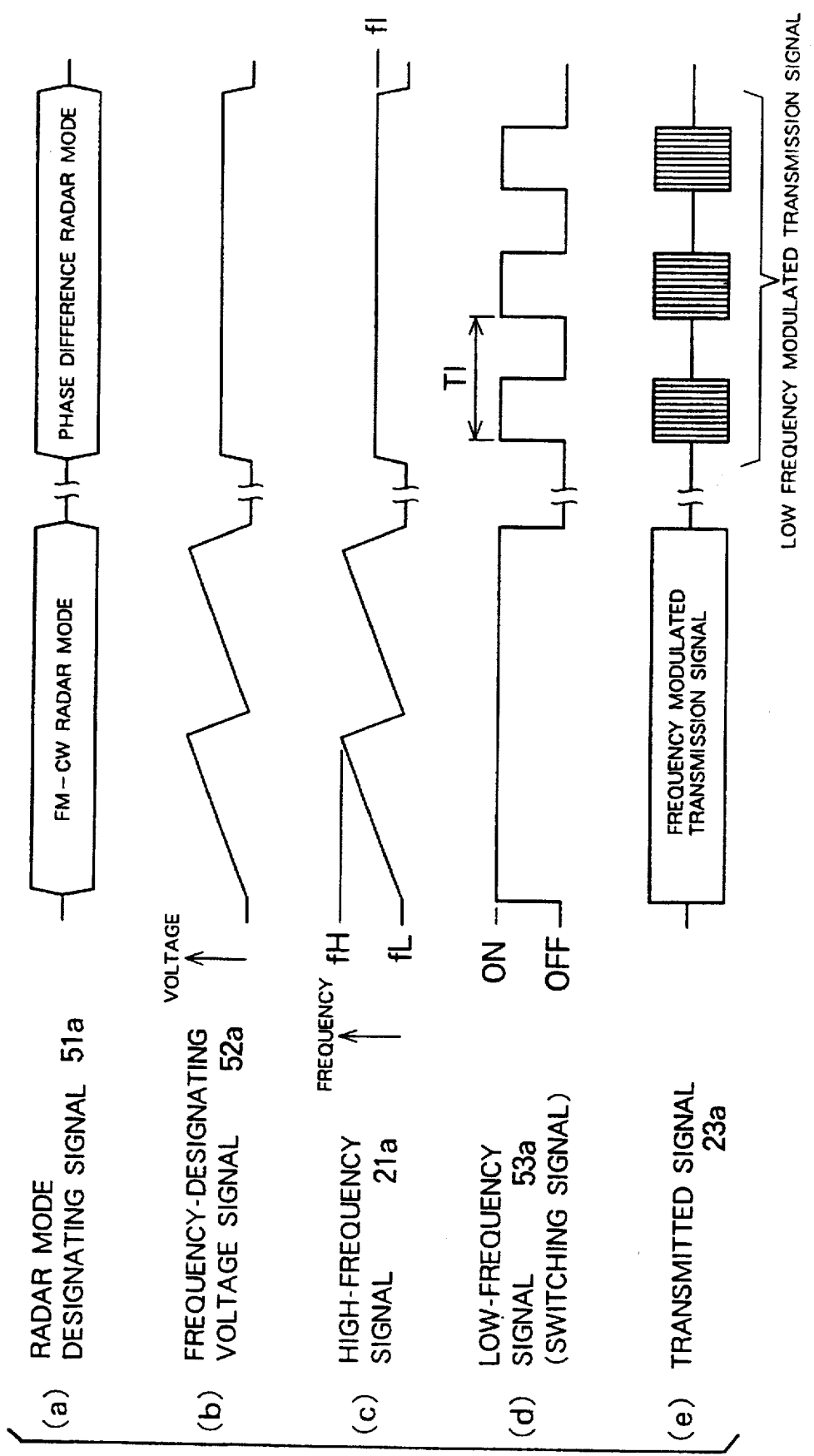
FIG. 2 is a time chart illustrating the mode switching operation of the radar system according to the invention.

Reference is initially taken to FIG. 1 showing, in block diagram, a radar system according to the present invention and to FIG. 2 in which a time chart of switching operation of the radar mode of the radar system is shown. As shown in FIG. 1, the radar system 1 comprises a transmitter 2, a receiver 3, a signal processor 4, and a radar mode switching control 5.

The transmitter 2 comprises a voltage-controlled oscillator 21, a power divider 22, a switching device 23, and a transmitting antenna 24. The receiver 3 comprises a receiving antenna 31, a high-frequency amplifier 32, a mixer 33, and a detector 34. The signal processor 4 comprises a beat frequency detector 41, a phase difference detector 42 and a distance operator 43. The radar mode control 5 comprises a radar mode designator 51, an oscillation-frequency-designating voltage generator 52 and a low-frequency-modulated signal generator 53.

In the radar system 1, the radar modes are switched by a radar mode designating signal 51a output from the radar mode designator 51. As shown in FIG. 2, (a), the radar mode generator 51 outputs, in a time-division way, a radar mode designating signal 51a which effects time-division designation of an FM-CW radar mode or a phase difference radar mode.

The oscillation-frequency-designating voltage generator 52 is arranged such that it generates and outputs a frequency designating voltage signal 52a of sawtooth waveform or triangular waveform as the FM-CW radar mode is designated, and outputs a predetermined voltage signal 52a as the phase difference radar mode is designated, as shown in FIG. 2, (b).

As shown in FIG. 2, (d), the low-frequency-modulated signal generator 53 is designed to output a signal 53a for keeping the switching device 23 in an ON state as the FM-CW radar mode is designed and generates and outputs a low-frequency signal 53a of a rectangular waveform with a repeat period TI as the phase difference radar mode is designated.

When the FM-CW radar mode is designated, the frequency designating voltage signal 52a with a voltage varying with the lapse of time is supplied to the frequency designating voltage input terminal 21a of the voltage-controlled oscillator 21. Thus, based on the frequency designating voltage signal 52, an FM (frequency modulated) signal 21a, frequency swept from frequency fL to frequency fH as shown in FIG. 2, (c), is output. The FM signal 21a is supplied to the switching device 23 by means of the power divider 22.

In the FM-CW radar mode, since the switching device 23 is fed with the signal 53a for keeping it in an ON state from the low-frequency modulated signal generator 53, the signal 22a supplied via the power divider 22 passes through the switching device 23, and a transmission signal 23a, frequency modulated as shown in FIG. 2, (e), is radiated as an electromagnetic wave from an antenna 14.

When the phase difference radar mode is designated, the frequency designating voltage input terminal 21a of the voltage-controlled oscillator 21 is fed with the signal 52a of a predetermined voltage, and hence the high-frequency signal 21a with a frequency fI corresponding to the voltage is output and supplied via the power divider 22 to the switching device 23.

In the phase difference radar mode, since the switching device 23 is switched based on the low-frequency modulated signal 53a shown in FIG. 2, (d), the transmission signal 23a, modulated into a rectangular waveform by a low frequency as shown in FIG. 2, (e), is radiated as an electromagnetic wave from the transmitting antenna 14.

A signal received by the receiving antenna 31 is high-frequency amplified in the high-frequency amplifier 32, and the amplified output 32a is supplied to the mixer 33 and detector 34. The mixer 33 mixes a signal part 22b separated from the high-frequency signal 21 by means of the power divider 22 with the high-frequency amplified output (received signal) 32a, and outputs a beat signal 33a of the mixed signals. The detector 34 detects the high-frequency amplified output 32a, and produces a detected output 34a.

The beat frequency detector 41 detects the frequency of the beat signal 33a and outputs frequency data 41a. The phase difference detector 42 detects the difference between the low-frequency modulated signal 53a and the detected output 34a and outputs phase difference data 42a. The distance detector 43 calculates the distance or range to a target based on the frequency data 41a as the FM-CW radar mode is designated in response to the radar mode designating signal 51a, or based on the phase difference data 42a as the phase difference radar mode is designated, and outputs the calculated range data 43a.

Figure 3:
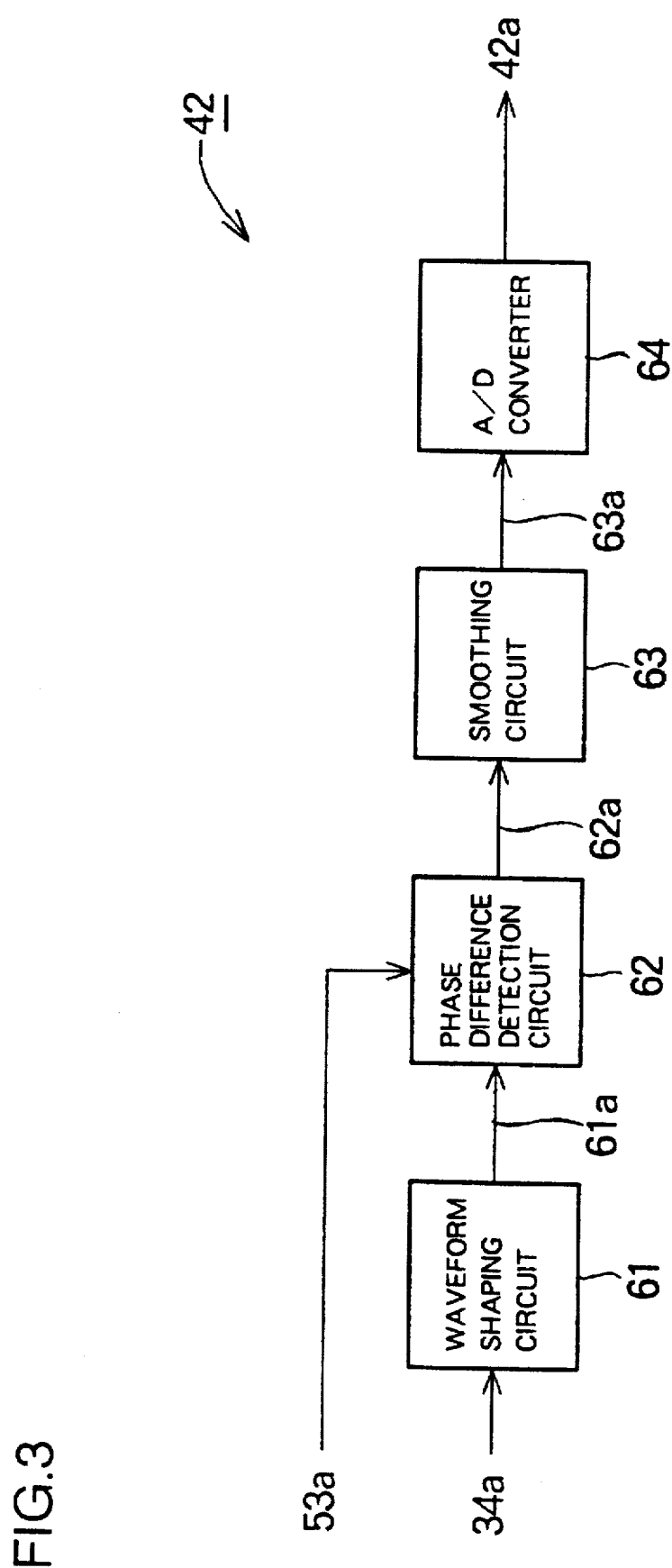
FIG. 3 is a block diagram illustrating an example of a phase difference sensor.

Reference is now taken to FIG. 3 which shows, in block diagram, an illustrative embodiment of the phase difference detector according to the present invention and to FIG. 4 which is a time chart of operation of the embodiment. The phase difference detector 42 comprises a waveform shaping circuit 61 for shaping the waveform of the detected output 34a and generating a binarized waveform-shaped output 61a, a phase difference detecting circuit 62 for detecting the phase difference between the low-frequency signal 53a corresponding to the transmission signal and the wave-form-shaped output 61a and outputting a signal 62a with a pulse width corresponding to the detected phase difference, a smoothing circuit 63 for smoothing the signal 62a outputting a DC voltage signal 63a, and an A/D converter 64 for converting the smoothed output 63a from analog to digital and outputting data 42a corresponding to the phase difference.

The phase difference detection circuit 62 is comprised of, for example, an exclusive OR (EX-OR) circuit for generating the signal 62a with a pulse width corresponding to the phase difference as shown in FIG. 4, (e), whereafter the DC voltage signal 63a shown in FIG. 4, (f), is obtained by means of the smoothing circuit 63. It should be noted that while FIG. 4, (f), shows a case where a pulsating voltage signal is obtained by means of the smoothing circuit 63 having a relatively long charge/discharge time constant, an alternative arrangement may be employed in which a signal having a pulse width corresponding to the phase difference is integrated in an integration circuit having a short charge time constant and a long discharge time constant, for a predetermined period of time or a predetermined number of times of intermittent transmission, whereafter the integrated output voltage is subjected to A/D conversion.

Application of an exclusive OR (EX-OR) circuit to the phase difference detecting circuit 62 provides an advantage that the smoothed output will have fewer pulsating components, because the signal 62a, having a pulse width corresponding to the phase difference in each of two periods, namely, one between the rise of the transmitted signal and the rise of the received signal and the other between the fall of the transmitted signal and the fall of the received signal, is generated. Where there exists a plurality of different targets having different ranges, the output period (pulse width) of the detected output 34a may become longer than the transmission period, because the signals reflected by each target overlaps in such a manner that they are displaced by the time difference corresponding to the difference between the ranges to the targets. In such instance, the above-mentioned rise time difference differs from the fall time difference, and hence the pulse width corresponding to the fall time difference becomes longer. Thus, the value of the measured range of a target at the shortest range away becomes larger than the value of the actual range thereto. Consequently, the phase difference detection circuit 62 may be arranged such that it outputs a signal having a pulse width corresponding to the phase between the rise of the transmitted signal and the fall of the received signal.

As thus far explained in detail, the inventive radar system is arranged to allow switched use of the FM-CW radar mode, which is designed to sense a target at an intermediate to long distance away, and the phase difference radar mode, which is designed to sense a target at a short distance away, whereby sensing is enabled with respect to a target at a short to long distance away. It is possible for a vehicle mounting the radar system 1 to sense, for example, a separate vehicle several to several ten meters ahead using the FM-CW radar mode and find out, using the phase difference radar mode, a distance in centimeters to an obstacle upon making a turn to the right or left, or parking.

While discussion has been made as to the case wherein modulation for transmission in the phase difference radar mode is performed intermittently with low-frequency signals, a separate arrangement may also be used in which the amplitude of the high-frequency signal 21a is binarized on the basis of the low-frequency signal 53a of rectangular waveform. Alternatively, the low-frequency modulated signal generator 53 may be comprised of a sine-wave generator so that a signal, obtained through amplitude modulation of a high-frequency signal on the basis of the sine-wave signal output from the sine-wave generator, is radiated as an electromagnetic wave, in which instance an amplitude modulator will be required.

As described above, the radar system according to the present invention is arranged to allow switched use of the FM-CW radar mode and phase difference radar mode, whereby an extremely closely located target, which is difficult to be sensed by the FM-CW radar mode, can be sensed with high precision by the phase difference radar mode, resulting in capability of the system to sense a target at a short to long distance away with high accuracy.

What is claimed is:

1. A radar system for transmitting a signal of high frequency, receiving a signal reflected by a target and detecting a distance to the target based on the time difference between the transmitted signal and received signal, said system comprising:

an FM-CW radar mode for transmitting an FM-CW signal resulted from sweeping the frequency of a first high frequency signal, receiving a signal reflected by said target and determining the distance to said target based on the frequency of a beat signal obtained by mixing said transmitted signal and received signal;

a phase difference radar for transmitting a signal resulted from modulation of a second high frequency signal by a low frequency signal, receiving and detecting a signal reflected by said target and determining the distance to said target based on the phase difference between said received, detected low frequency signal and said transmitted low frequency signal; and a radar mode switching control for allowing switched use of said FM-CW radar mode and said phase difference radar mode.

2. A radar system according to claim 1, the system being mounted on a vehicle to sense a target at an intermediate to long distance away from the vehicle by said FM-CW radar mode and to sense a target at a short distance away from the vehicle by means of said phase difference radar mode.

3. A radar system for transmitting a signal of high frequency, receiving a signal reflected by a target and detecting a distance to the target based on the time difference between the transmitted signal and received signal, said system comprising:

an FM-CW radar mode for transmitting an FM-CW signal resulted from sweeping the frequency of a first high frequency signal, receiving a signal reflected by said target and determining the distance to said target based on the frequency of a beat signal obtained by mixing said transmitted signal and received signal;

a phase difference radar mode for transmitting a signal resulting from modulation of a second high frequency signal by a low frequency signal, receiving and detecting a signal reflected by said target and determining the distance to said target based on the phase difference between said received, detected low frequency signal and said transmitted low frequency signal;

a radar mode switching control for allowing switched use of said FM-CW radar mode and said phase difference radar mode; and a phase difference detector operative only in said phase difference radar mode for detecting said phase difference between said low-frequency signal and said detected low-frequency signal and outputting phase difference data, said phase difference detector comprising a phase difference detection circuit for detecting said phase difference between said low-frequency signal and a waveform-shaped version of said detected low-frequency signal, and outputting a pulse signal corresponding to said phase difference, a smoothing circuit for smoothing said pulse signal and supplying, as an output, a DC signal corresponding to said phase difference, and an A/D converter for A/D converting said output from said smoothing circuit into data corresponding to said phase difference.

4. A radar system according to claim 3, wherein said smoothing circuit comprises an integration circuit for integrating said pulse signal for a predetermined period of time or a predetermined number of times of intermittent transmission and A/D converting the resultant integrated output voltage to thereby obtain data corresponding to said phase difference.

5. A radar system according to claim 3 or 4, wherein said phase difference detection circuit comprises an exclusive OR circuit.

6. A radar system according to claim 3, the system being mounted on a vehicle to sense a target at an intermediate to long distance away from the vehicle by said FM-CW radar mode and to sense a target at a short distance away from the vehicle by said phase difference radar mode.

7. A radar system for transmitting a signal of high frequency, receiving a signal reflected by a target and detecting a distance to the target based on the time difference between the transmitted signal and received signal, said system comprising:

an FM-CW radar mode for transmitting an FM-CW signal resulting from sweeping the frequency of a first high frequency signal, receiving a signal reflected by said target and determining the distance to said target based on the frequency of a beat signal obtained by mixing said transmitted signal and received signal;

a phase difference radar mode for transmitting a signal resulting from modulation of a second high frequency signal by a low frequency signal, receiving and detecting a signal reflected by said target and determining the distance to said target based on the phase difference between said received, detected low frequency signal and said transmitted low frequency signal;

a transmitting antenna;

an oscillator for generating said first and second high frequency signals; and a switching device disposed between said oscillator and said antenna for remaining in an ON state in said FM-CW radar mode for allowing an FM-CW signal to be transmitted to said antenna, and being turned on and off in response to said low frequency signals in said phase difference radar mode to supply intermittently modulated high-frequency signals of a predetermined frequency to said antenna.

8. A radar system according to claim 7, the system being mounted on a vehicle to sense a target at an intermediate to long distance away from the vehicle by said FM-CW radar mode and to sense a target at a short distance away form the vehicle by said phase difference radar mode.

* * * * *